United States Patent
Ballantyne et al.

(10) Patent No.: US 11,599,385 B2
(45) Date of Patent: Mar. 7, 2023

(54) SYSTEM AND METHOD FOR DISTRIBUTION OF DEPENDENT BUILDS ACROSS ORCHESTRATION JOB SCHEDULER SLAVES

(71) Applicant: EMC IP Holding Company, LLC, Hopkinton, MA (US)

(72) Inventors: Robert A. Ballantyne, Mansfield, MA (US); Robert J. Bell, Mont Vernon, NH (US); Andrew Daolong Fan, Shanghai (CN); Moshe Fried, Raanana (IL); Henrik Koren, Petach Tikva (IL); Tadd V. Ottman, Hayward, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/530,734

(22) Filed: Aug. 2, 2019

(65) Prior Publication Data

US 2021/0034413 A1 Feb. 4, 2021

(51) Int. Cl.
*G06F 9/48* (2006.01)
*G06F 11/36* (2006.01)
*G06F 8/70* (2018.01)
*G06F 8/36* (2018.01)

(52) U.S. Cl.
CPC .............. *G06F 9/4881* (2013.01); *G06F 8/36* (2013.01); *G06F 8/70* (2013.01); *G06F 11/3688* (2013.01)

(58) Field of Classification Search
CPC .......... G06F 11/00–78; G06F 8/00–78; G06F 9/4881; G06F 8/36; G06F 8/70; G06F 11/3688
See application file for complete search history.

(56) References Cited

U.S. PATENT DOCUMENTS

| | | | |
|---|---|---|---|
| 10,083,030 B1* | 9/2018 | Fant, IV | G06F 8/61 |
| 10,515,005 B1* | 12/2019 | Burrell | G06F 11/368 |
| 2014/0143756 A1* | 5/2014 | Liang | G06F 8/70 |
| | | | 717/120 |
| 2015/0128121 A1* | 5/2015 | Garcia | G06F 8/65 |
| | | | 717/170 |

(Continued)

OTHER PUBLICATIONS

Hummer, Waldemar, et al. "Modelops: Cloud-based lifecycle management for reliable and trusted ai." 2019 IEEE International Conference on Cloud Engineering (IC2E). IEEE, Jun. 2019. (Year: 2019).*

(Continued)

*Primary Examiner* — S. Sough
*Assistant Examiner* — Joanne G Macasiano
(74) *Attorney, Agent, or Firm* — Brian J. Colandreo; Mark H. Whittenberger; Holland & Knight LLP

(57) ABSTRACT

A method, computer program product, and computer system for obtaining an input for a build. An initial orchestration job scheduler object may be obtained based upon the input for the build. A directed acyclic graph (DAG) may be determined based upon, at least in part, a dependency engine preprocessing. The DAG may be stored in a format. An array of steps may be built based upon, at least in part, the object, wherein the DAG may be translated from the object into a format readable by an initial orchestration job scheduler to build the array of steps. The array of steps may be executed to perform the build.

19 Claims, 7 Drawing Sheets

(56) References Cited

U.S. PATENT DOCUMENTS

| | | | | |
|---|---|---|---|---|
| 2015/0178052 | A1* | 6/2015 | Gupta | H04L 67/02 |
| | | | | 717/105 |
| 2017/0168801 | A1* | 6/2017 | Eberlein | G06F 8/71 |
| 2018/0081653 | A1* | 3/2018 | Ahmed | G06F 16/13 |
| 2019/0163469 | A1* | 5/2019 | Sreenivasa | H04L 63/0281 |
| 2020/0326936 | A1* | 10/2020 | Sigmon | G06F 8/60 |

OTHER PUBLICATIONS

Beller, Moritz, Georgios Gousios, and Andy Zaidman. "Oops, my tests broke the build: An explorative analysis of travis ci with github." 2017 IEEE/ACM 14th International Conference on Mining Software Repositories (MSR). IEEE, 2017. (Year: 2017).*

* cited by examiner

SYSTEM AND METHOD FOR DISTRIBUTION OF DEPENDENT BUILDS ACROSS ORCHESTRATION JOB SCHEDULER SLAVES

BACKGROUND

Generally, performing a complete and distributed build of multiple source code management repositories (e.g., GitHub repositories) may be challenging, at the very least when all repositories are being updated independently, and frequently dependencies exist among component repositories, which must be observed, to generate a final image accurately.

BRIEF SUMMARY OF DISCLOSURE

In one example implementation, a method, performed by one or more computing devices, may include but is not limited to obtaining an input for a build. An initial orchestration job scheduler object may be obtained based upon the input for the build. A directed acyclic graph (DAG) may be determined based upon, at least in part, a dependency engine preprocessing. The DAG may be stored in a format. An array of steps may be built based upon, at least in part, the object, wherein the DAG may be translated from the object into a format readable by an initial orchestration job scheduler to build the array of steps. The array of steps may be executed to perform the build.

One or more of the following example features may be included. A source code management repository containing pointers to each component repository may be used to provide a consistent snapshot in time across one or more repositories to obtain the input for the build. A repository may be cloned from the consistent snapshot to obtain the initial orchestration job scheduler object. The DAG may be translated from the object into a format readable by an initial orchestration job scheduler to build the array of steps. The array of steps may be aggregated. One or more systems associated with the build may be initialized for testing. The testing may be executed.

In another example implementation, a computing system may include one or more processors and one or more memories configured to perform operations that may include but are not limited to obtaining an input for a build. An initial orchestration job scheduler object may be obtained based upon the input for the build. A directed acyclic graph (DAG) may be determined based upon, at least in part, a dependency engine preprocessing. The DAG may be stored in a format. An array of steps may be built based upon, at least in part, the object, wherein the DAG may be translated from the object into a format readable by an initial orchestration job scheduler to build the array of steps. The array of steps may be executed to perform the build.

One or more of the following example features may be included. A source code management repository containing pointers to each component repository may be used to provide a consistent snapshot in time across one or more repositories to obtain the input for the build. A repository may be cloned from the consistent snapshot to obtain the initial orchestration job scheduler object. The DAG may be translated from the object into a format readable by an initial orchestration job scheduler to build the array of steps. The array of steps may be aggregated. One or more systems associated with the build may be initialized for testing. The testing may be executed.

In another example implementation, a computer program product may reside on a computer readable storage medium having a plurality of instructions stored thereon which, when executed across one or more processors, may cause at least a portion of the one or more processors to perform operations that may include but are not limited to obtaining an input for a build. An initial orchestration job scheduler object may be obtained based upon the input for the build. A directed acyclic graph (DAG) may be determined based upon, at least in part, a dependency engine preprocessing. The DAG may be stored in a format. An array of steps may be built based upon, at least in part, the object, wherein the DAG may be translated from the object into a format readable by an initial orchestration job scheduler to build the array of steps. The array of steps may be executed to perform the build.

One or more of the following example features may be included. A source code management repository containing pointers to each component repository may be used to provide a consistent snapshot in time across one or more repositories to obtain the input for the build. A repository may be cloned from the consistent snapshot to obtain the initial orchestration job scheduler object. The DAG may be translated from the object into a format readable by an initial orchestration job scheduler to build the array of steps. The array of steps may be aggregated. One or more systems associated with the build may be initialized for testing. The testing may be executed.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
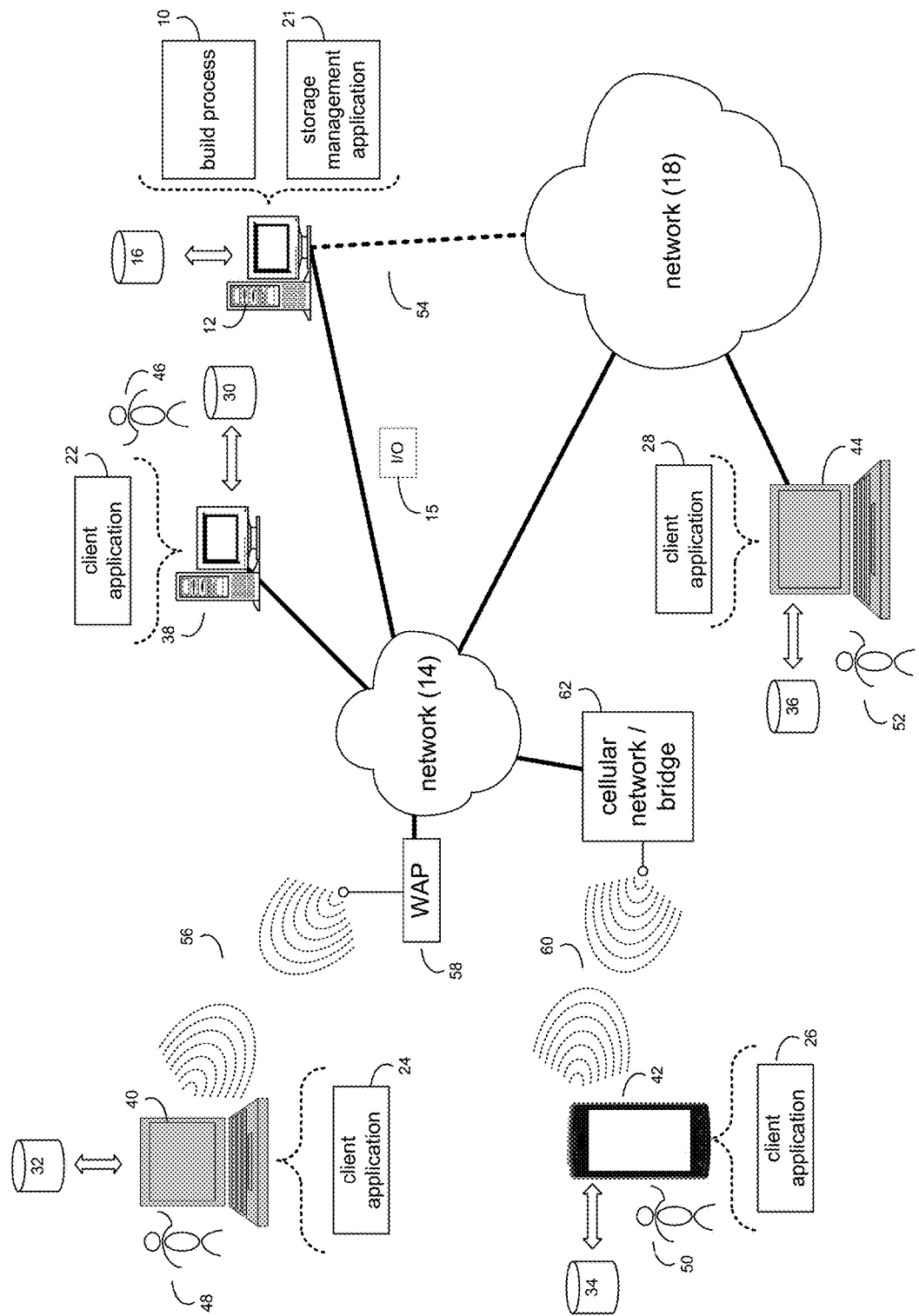
FIG. 1 is an example diagrammatic view of a build process coupled to an example distributed computing network according to one or more example implementations of the disclosure.

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internes using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations; these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown build process 10 that may reside on and may be executed by a computer (e.g., computer 12), which may be connected to a network (e.g., network 14) (e.g., the internet or a local area network). Examples of computer 12 and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United. States, other countries or both).

In some implementations, as will be discussed below in greater detail, a build process, such as build process 10 of FIG. 1, may obtain an input for a build. An initial orchestration job scheduler object may be obtained based upon the input for the build. A directed acyclic graph (DAG) may be determined based upon, at least in part, a dependency engine preprocessing. The DAG may be stored in a format. An array of steps may be built based upon, at least in part, the object, wherein the DAG may be translated from the object into a format readable by an initial orchestration job scheduler to build the array of steps. The array of steps may be executed to perform the build.

In some implementations, the instruction sets and subroutines of build process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, build process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, build process 10 and/or storage management application 21 may be accessed via one or more of client applications 22, 24, 26, 28. In some implementations, build process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within build process 10, a component of build process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of build process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc. capturing device, and a dedicated network device. Client electronic devices 38, 40, 42, 44 may each execute an operating system, examples of which may include but are not limited to, Android", Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of build process 10 (and vice versa). Accordingly, in some implementations, build process 10 may be a purely server-side application, a purely client-side application, or a hybrid server-side/client-side application that is cooperatively executed by one or more of client applications 22, 24, 26, 28 and/or build process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, build process 10, and storage management application 21, taken singly or in any combination, may effectuate some or all of the same functionality, any description of effectuating such functionality via one or more of client applications 22, 24, 26, 28, build process 10, storage management application 21, or combination thereof, and any described interaction(s) between one or more of client applications 22, 24, 26, 28, build process 10, storage management application 21, or combination thereof to effectuate such functionality, should be taken as an example only and not to limit the scope of the disclosure.

In some implementations, one or more of users 46, 48, 50, 52 may access computer 12 and build process 10 (e.g., using one or more of client electronic devices 38, 40, 42, 44) directly through network 14 or through secondary network 18. Further, computer 12 may be connected to network 14 through secondary network 18, as illustrated with phantom link line 54. Build process 10 may include one or more user interfaces, such as browsers and textual or graphical user interfaces, through which users 46, 48, 50, 52 may access build process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests a request that content be read from computer 12).

Figure 2:
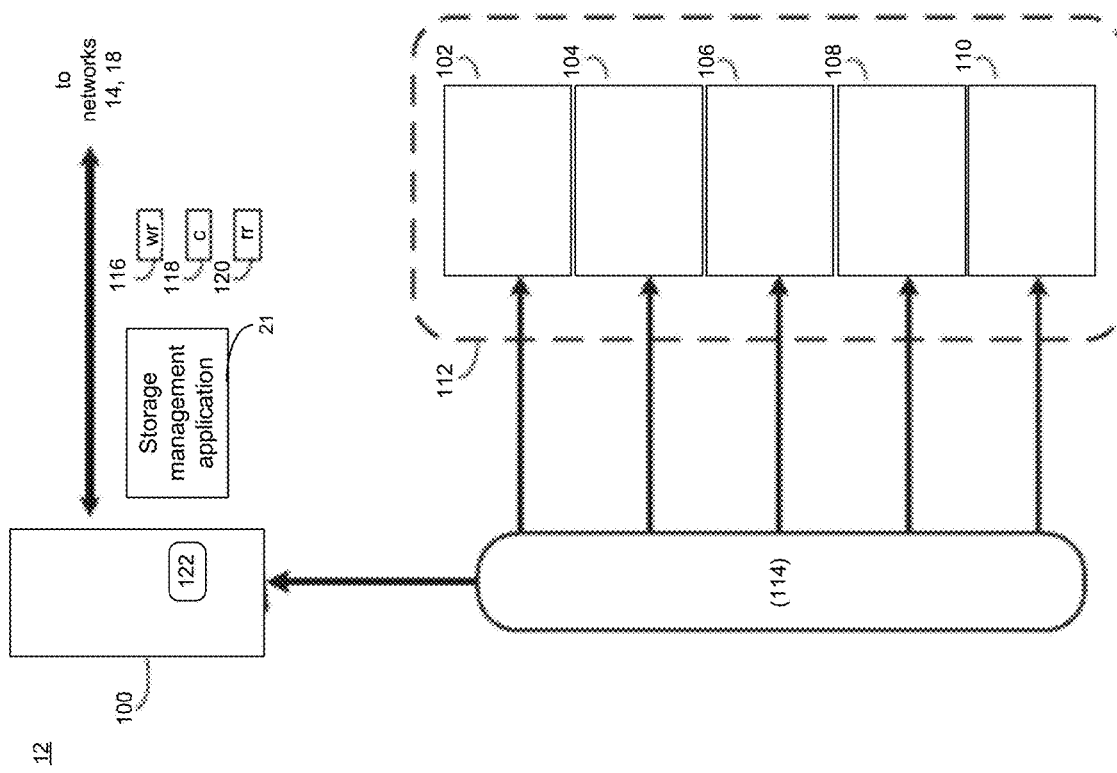
FIG. 2 is an example diagrammatic view of a storage system of FIG. 1 according to one or more example implementations of the disclosure.
Figure 3:
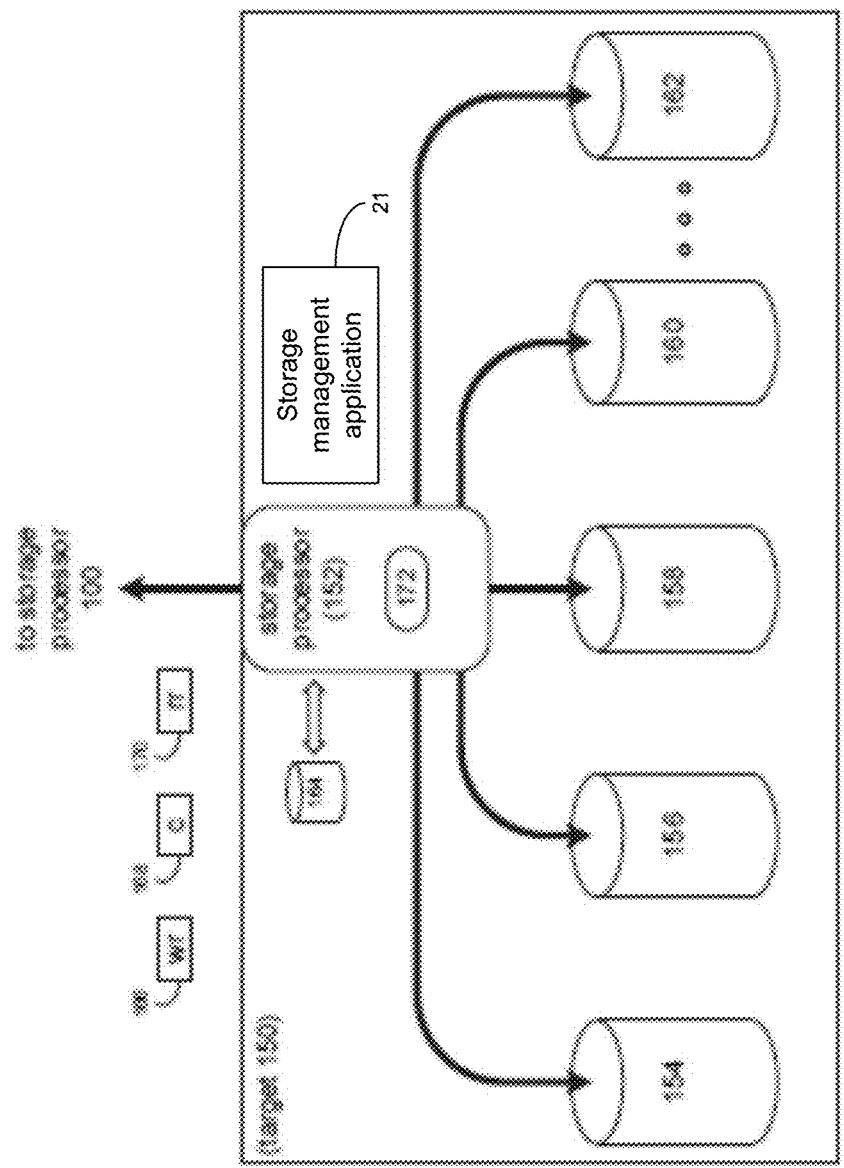
FIG. 3 is an example diagrammatic view of a storage target of FIG. 1 according to one or more example implementations of the disclosure.
Figure 4:
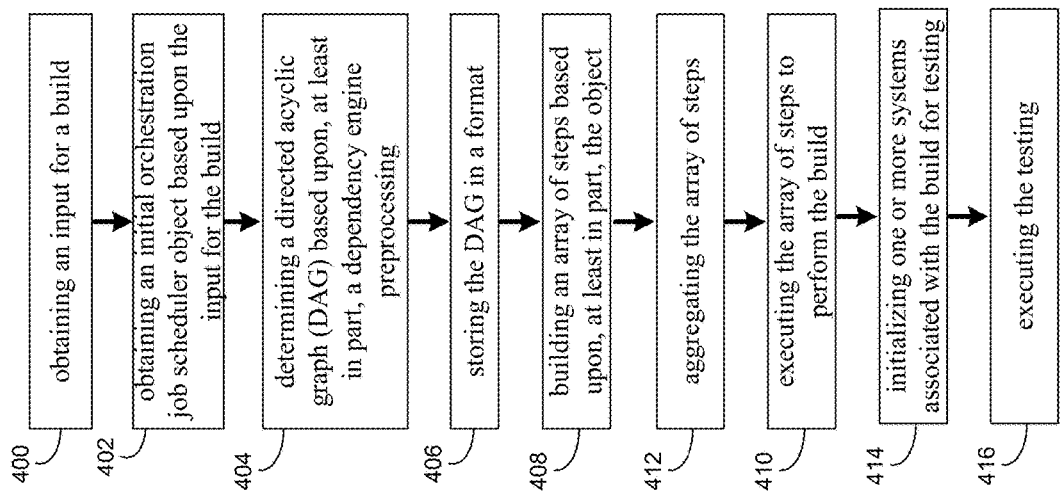
FIG. 4 is an example flowchart of a build process according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAM 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™ system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or build process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VNX™ system offered by Dell EMC™ of Hopkinton, Mass. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162, may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

Generally, performing a complete and distributed build of multiple source code management repositories (e.g., GitHub repositories) may be challenging, at the very least when all repositories are being updated independently, and frequently dependencies exist among component repositories, which must be observed, to generate a final image accurately. Additionally, performing a distributed dependency engine (e.g., Gradle) build using an orchestration job scheduler (e.g., Jenkins) may be problematic. Typically, there may be a cyclic dependency, where Jenkins invokes Gradle, which then invokes Jenkins. This may need a communication pipeline between Jenkins and Gradle that permits Gradle to say "Jenkins, we are doing this now", and "Jenkins, we finished this now." Additionally/alternatively, there may be hidden resources used, e.g., Gradle invokes and manages build slaves, which are unknown to Jenkins. Yet another associated issue may be that any solution may need to be simple for anyone to understand, where failures occur or where performance suffers. Combining both of these becomes even more challenging.

Some systems may attempt to address these issues by building everything on a single node; however, the logs become very large, parallelism may cause the logs to be interleaved, and alternatively, serial builds may take too long, build infrastructure has large system requirements, and some builds are too slow as a result.

Other systems may attempt to address these issues by using distributed builds with a home grown dependency management, which may be very difficult to understand or trace/debug/profile, and may be unstable. Moreover, other systems may attempt to address these issues may use hidden resources, where the build manager invoked build slaves which were hidden from Jenkins.

As such, as will be discussed below, the present disclosure may address one or more of these problems using a distribution of dependent builds across orchestration job scheduler (e.g., Jenkins) slaves' using dependency engine (e.g., Gradle) low level information to generate a representation JSON representation) of the build's Directed Acyclic Graph (DAG) of dependencies, and have a Jenkins pipeline process that JSON to achieve the distributed build pipeline. This may allow a build farm of Jenkins slaves to be used to perform a full or incremental build of multiple distributed GitHub repositories when all repositories are being updated independently and frequently, and there are dependencies among component repositories that should/must be observed in order to generate a final image accurately. Advantageously, use of pipelines may make it easier and faster for developers to find build errors or profile build performance, as well as hiding a lot of the logs until they are needed.

The Build Process:

As discussed above and referring also at least to the example implementations of FIGS. 4-7, build process 10 may obtain 400 an input for a build. Build process 10 may obtain 402 an initial orchestration job scheduler object based upon the input for the build. Build process 10 may determine 404 a directed acyclic graph (DAG) based upon, at least in part, a dependency engine preprocessing. Build process 10 may store 406 the DAG in a format. Build process 10 may build 408 an array of steps based upon, at least in part, the object, wherein the DAG may be translated from the object into a format readable by an initial orchestration job scheduler to build the array of steps. Build process 10 may execute 410 the array of steps to perform the build.

Figure 5:
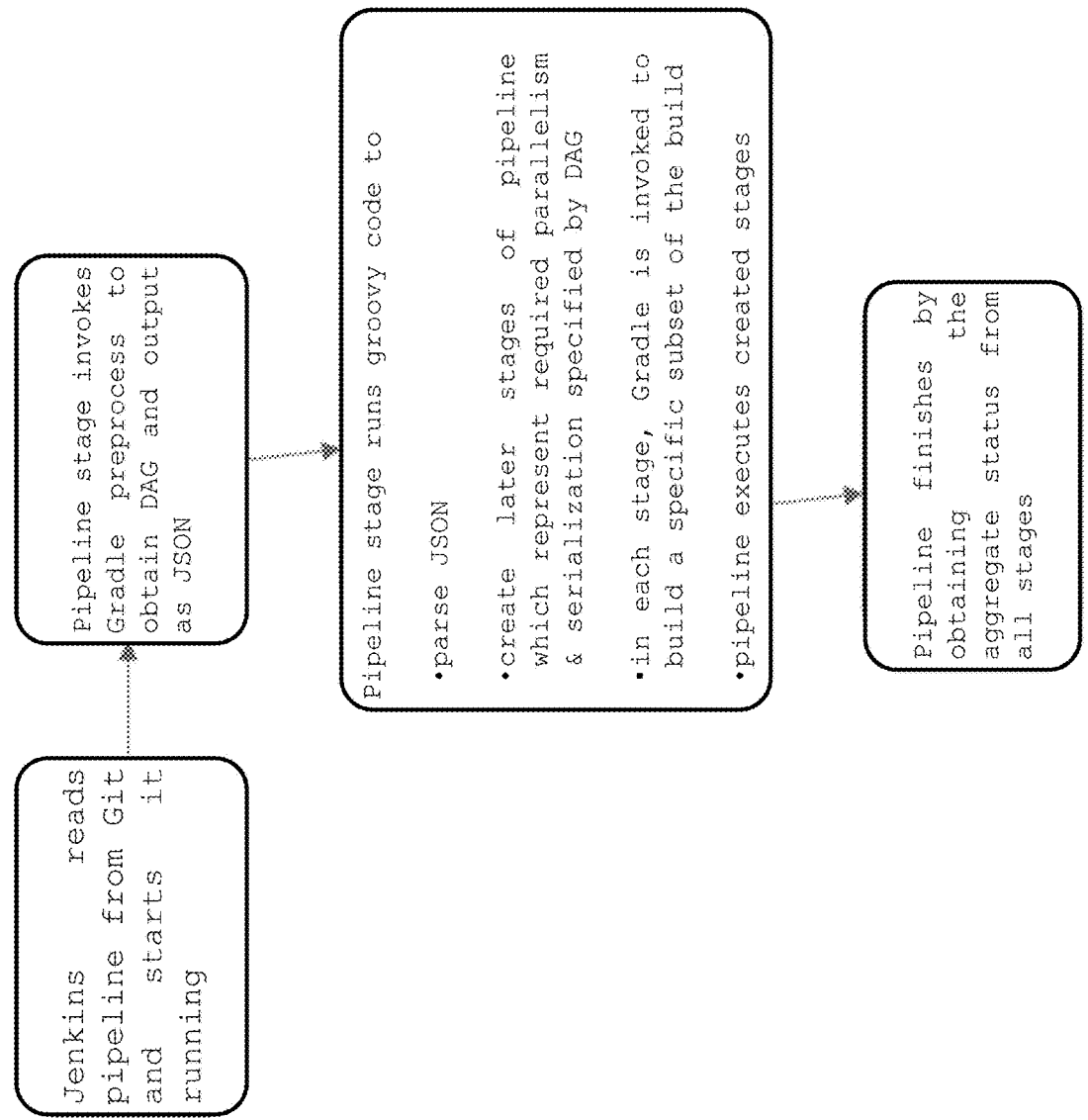
FIG. 5 is an example alternative diagrammatic view of a build process according to one or more example implementations of the disclosure.

For instance, and referring at least to the example implementation of FIG. 5, an example alternative view 500 of build process 10 is shown. It will be appreciated that while the present disclosure uses terms like Jenkins, any type of orchestration job scheduler may be used without departing from the scope of the disclosure. Similarly, while the present disclosure uses terms like Gradle, any type of dependency engine may be used without departing from the scope of the disclosure. Similarly, while the present disclosure uses terms like GitHub, any type of source code management repository or module may be used without departing from the scope of the disclosure. Similarly, while the present disclosure uses terms like JavaScript Object Notation (NON) format, any type of data interchange format may be used without departing from the scope of the disclosure. As such, the use of these terms should be taken as example only and not to otherwise limit the scope of the present disclosure.

Figure 6:
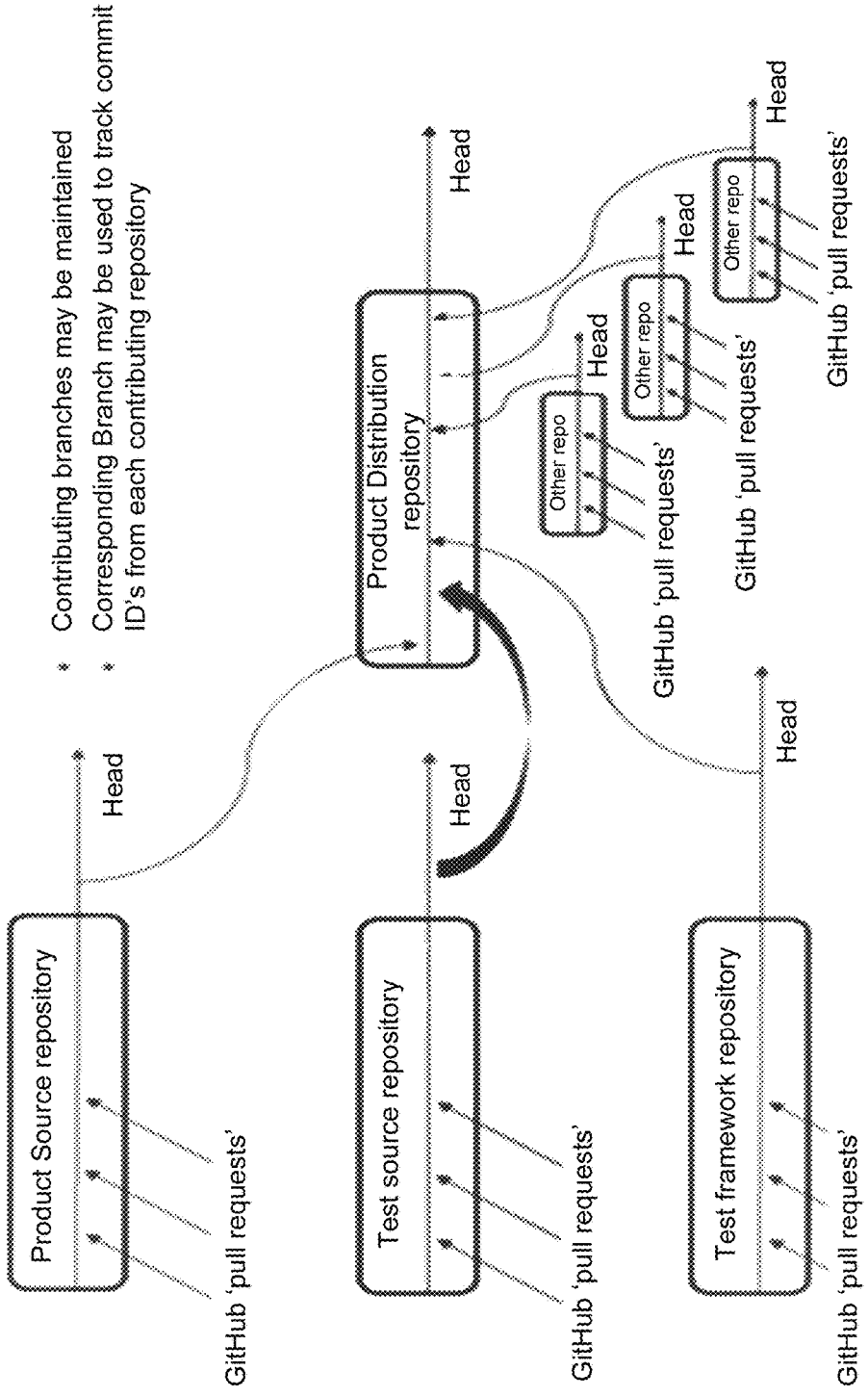
FIG. 6 is an example alternative diagrammatic view of a repository according to one or more example implementations of the disclosure.
Figure 7:
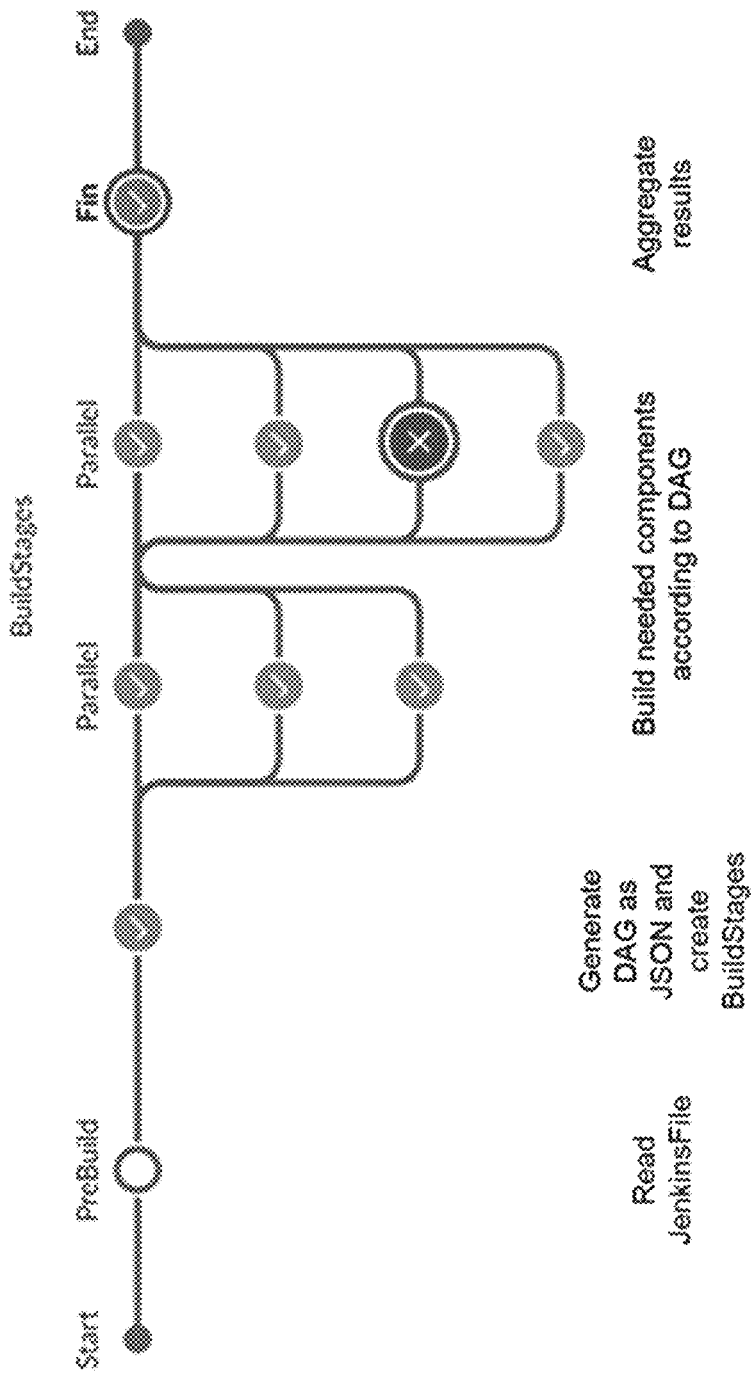
FIG. 7 is an example alternative diagrammatic view of a build test result according to one or more example implementations of the disclosure.

In some implementations, build process 10 may obtain 400 an input for a build, and in some implementations, a source code management repository containing pointers to each component repository may be used to provide a consistent snapshot in time across one or more repositories to obtain the input for the build. For example, a GitHub repository containing pointers to each component repository may be used to provide a consistent "snapshot in time" across all repositories (or a single module/repository) to be used as the input for the build. In some implementations, build process 10 may allow such pointers to be updated only when a consistent build may be achieved. This may prevent unintended changes from occurring during the build. An example repository 600 with the above-noted pointers to each component repository is shown in the example implementation of FIG. 6. As shown in FIG. 6, contributing branches may generally be maintained, and corresponding branch in repository 600 may be used to track commit ID's from each contributing repository.

In some implementations, build process 10 may obtain 402 an initial orchestration job scheduler object based upon the input for the build, and in some implementations, a repository may be cloned from the consistent snapshot to obtain the initial orchestration job scheduler object. For instance, Jenkins (e.g., via rebuild process 10) may clone a Git repository from the snapshot, to obtain the initial Jenkins object (e.g., file), which it may invoke. The Jenkins file may have the capability to tell Jenkins on which node it wishes something to execute, as well as to provide a script reference that may be executed. The Jenkins file may comprise various stages that contain steps In some implementations, build process 10 may determine 404 a directed acyclic graph (DAG) based upon, at least in part, a dependency engine preprocessing, and in some implementations, build process 10 may store 406 the DAG in a format. For instance, build process 10 may also use low level preprocess data from Gradle (or other dependency engine) to represent the DAG for the build, prior to performing any build activity. This may permit the collection of vertices within the DAG to contain only the parts of the build that need to be rebuilt. For example, the first stage of the Jenkins file may (e.g., via rebuild process 10) clone a "product source" repository, then run Gradle preprocessing (e.g., via rebuild process 10) to determine the DAG for what needs to be built. This may then be saved in JSON format (or other appropriate format). For this part, the "normal" Gradle preprocessing may not be insufficient. That is, in some implementations, build process 10 may use the preprocessing to figure out what needs to be done and in what order, but does not directly execute the steps. In some implementations, at least one component repository may be skipped in the cloning based upon, at least in part, the DAG. That is, additionally alternative, as an option, the JSON may (e.g., via rebuild process 10) encode whether Gradle would obtain results from cache (i.e., the above-noted information is already there in cache) or whether the results need to build from scratch (which may take a lot of resources), which determines a requirement to clone (i.e., whether cloning is needed at all or if build process 10 may obtain the information from cache and therefore the need to download source for dependency or build dependency may be removed). As such, the cloning may itself be governed by the DAG such that cloning of some components may be skipped when unchanged since prior builds, and therefore may be available from caches.

In some implementations, build process 10 may build 408 an array of steps based upon, at least in part, the object, where in some implementations, the DAG may be translated from the object into a format readable by an initial orchestration job scheduler to build the array of steps. For instance, the second stage of the Jenkins file (e.g., via rebuild process 10) reads the JSON and builds an array of steps. Each step may use a "Jenkins Label" (or other label as appropriate) to specify on which node it should run, as well as which component it should build, A JSON representation of the DAG may be generated (e.g., the information in the DAG may be "translated" into a Jenkins readable format) and passed to a Jenkins pipeline, which then (e.g., via rebuild process 10) may dynamically generate the collection of Jenkins nodes required for the build. The pipeline may also (e.g., via rebuild process 10) sequence these build steps according to the DAG so that the build is correctly represented, using one or more Jenkins nodes (slaves) as needed. To be clear, the "Jenkins label" is not used to determine which component to build, but instead, on which node the component should be built. Labels denote categories of nodes to Jenkins. In a sense, the DAG determines what should be built and Jenkins determines where it should be built.

In some implementations, build process 10 may execute 410 the array of steps to perform the build. For example, the third stage of the Jenkins file executes via rebuild process 10) the array of steps created as noted above. The pipeline may then execute (e.g., via rebuild process 10) the steps to complete the build. This may permit Jenkins to know and manage what resources are in use, while the build dependencies from Gradle may be satisfied in the most expedient manner. Individual builds of component repositories may be performed on the same snapshot of the build source obtained at the start of the process.

In some implementations, build process 10 may aggregate 412 the array of steps. For example, the fourth stage of the Jenkins file may perform aggregation (e.g., via rebuild process 10) of the steps in prior stages, as well as perform any reporting (or failure analysis/traceability) needed.

In some implementations, build process 10 may initialize 414 one or more systems associated with the build for testing, and in some implementations may execute 416 the testing. For instance, when the fourth stage of the Jenkins file is successful, subsequent stages may initialize systems for testing and then execute the required tests. An example diagrammatic view of a build test result 700 after the above-noted steps is shown in the example implementation of FIG. 7.

As such, build process 10 may advantageously use a GitHub repository 600 to provide a consistent snapshot of other GitHub repositories involved in the build, output of a DAG in JSON format from low level Gradle preprocessing, execute processing of JSON representation of the DAG by a Jenkins pipeline before build execution, and continue Jenkins management of its resources to perform the low-level build functions. This may allow a build farm of Jenkins slaves to be used to perform a full or incremental build of multiple distributed GitHub repositories when all repositories are being updated independently and frequently, and there are dependencies among component repositories that should/must be observed in order to generate a final image accurately. Advantageously, use of pipelines may make it easier and faster for developers to find build errors or profile build performance, as well as hiding a lot of the logs until they are needed.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   obtaining an input for a build, wherein a source code management repository, including one or more pointers, is used to provide a consistent snapshot in time across one or more repositories to obtain the input for the build, wherein each of the one or more pointers are associated with a respective component repository, wherein obtaining the input for the build includes updating at least one pointer of the one or more pointers only when the build is achieved;
   obtaining an initial orchestration job scheduler object based upon the input for the build;
   determining a directed acyclic graph (DAG) based upon, at least in part, a dependency engine preprocessing;
   storing the DAG in a format;
   building an array of steps based upon, at least in part, the initial orchestration job scheduler object;
   translating information in the DAG from the initial orchestration job scheduler object into a format readable by an initial orchestration job scheduler to build the array of steps, wherein the building of the array of steps includes:
     passing the information in the DAG translated into the readable format to a pipeline and dynamically generating a collection of nodes required for the building of the array of steps, wherein each of the array of steps is associated with at least one label configured to specify on which node, of the collection of nodes, each of the array of steps should be executed on; and
     sequencing the array of steps using the pipeline according to the DAG, wherein the array of steps according to the DAG includes one or more orchestration job scheduler slaves; and
   executing the array of steps to perform the build.

2. The computer-implemented method of claim 1, wherein a repository is cloned from the consistent snapshot to obtain the initial orchestration job scheduler object.

3. The computer-implemented method of claim 2, wherein at least one component repository is skipped in the cloning based upon, at least in part, the DAG.

4. The computer-implemented method of claim 1, further comprising aggregating the array of steps.

5. The computer-implemented method of claim 1, further comprising initializing one or more systems associated with the build for testing.

6. The computer-implemented method of claim 5, further comprising executing the testing.

7. The computer-implemented method of claim 1, wherein the DAG is stored using low level preprocess data from the dependency engine preprocessing.

8. The computer-implemented method of claim 1, wherein the pipeline processes the DAG translated into the readable format to achieve a distributed build pipeline before the build execution.

9. A computer program product residing on a non-transitory computer readable storage medium having a plurality of instructions stored thereon which, when executed across one or more processors, causes at least a portion of the one or more processors to perform operations comprising:
   obtaining an input for a build, wherein a source code management repository, including one or more pointers, is used to provide a consistent snapshot in time across one or more repositories to obtain the input for the build, wherein each of the one or more pointers are associated with a respective component repository, wherein obtaining the input for the build includes updating at least one pointer of the one or more pointers only when the build is achieved;
   obtaining an initial orchestration job scheduler object based upon the input for the build;
   determining a directed acyclic graph (DAG) based upon, at least in part, a dependency engine preprocessing;
   storing the DAG in a format;
   building an array of steps based upon, at least in part, the initial orchestration job scheduler object;
   translating information in the DAG from the initial orchestration job scheduler object into a format readable by an initial orchestration job scheduler to build the array of steps, wherein the building of the array of steps includes:

passing the information in the DAG translated into the readable format to a pipeline and dynamically generating a collection of nodes required for the building of the array of steps, wherein each of the array of steps is associated with at least one label configured to specify on which node, of the collection of nodes, each of the array of steps should be executed on; and sequencing the array of steps using the pipeline according to the DAG, wherein the array of steps according to the DAG includes one or more orchestration job scheduler slaves; and executing the array of steps to perform the build.

10. The computer program product of claim 9, wherein a repository is cloned from the consistent snapshot to obtain the initial orchestration job scheduler object.

11. The computer program product of claim 10, wherein at least one component repository is skipped in the cloning based upon, at least in part, the DAG.

12. The computer program product of claim 9, wherein the operations further comprise aggregating the array of steps.

13. The computer program product of claim 9, wherein the operations further comprise initializing one or more systems associated with the build for testing.

14. The computer program product of claim 13, wherein the operations further comprise executing the testing.

15. A computing system including one or more processors and one or more memories configured to perform operations comprising:

obtaining an input for a build, wherein a source code management repository, including one or more pointers, is used to provide a consistent snapshot in time across one or more repositories to obtain the input for the build, wherein each of the one or more pointers are associated with a respective component repository, wherein obtaining the input for the build includes updating at least one pointer of the one or more pointers only when the build is achieved;

obtaining an initial orchestration job scheduler object based upon the input for the build;

determining a directed acyclic graph (DAG) based upon, at least in part, a dependency engine preprocessing;

storing the DAG in a format;

building an array of steps based upon, at least in part, the initial orchestration job scheduler object;

translating information in the DAG from the initial orchestration job scheduler object into a format readable by an initial orchestration job scheduler to build the array of steps, wherein the building of the array of steps includes:

passing the information in the DAG translated into the readable format to a pipeline and dynamically generating a collection of nodes required for the building of the array of steps, wherein each of the array of steps is associated with at least one label configured to specify on which node, of the collection of nodes, each of the array of steps should be executed on; and sequencing the array of steps using the pipeline according to the DAG, wherein the array of steps according to the DAG includes one or more orchestration job scheduler slaves; and executing the array of steps to perform the build.

16. The computing system of claim 15, wherein a repository is cloned from the consistent snapshot to obtain the initial orchestration job scheduler object.

17. The computing system of claim 16, wherein at least one component repository is skipped in the cloning based upon, at least in part, the DAG.

18. The computing system of claim 15, wherein the operations further comprise aggregating the array of steps.

19. The computing system of claim 15, wherein the operations further comprise initializing one or more systems associated with the build for testing and executing the testing.

* * * * *